United States Patent
Künzler et al.

(10) Patent No.: US 7,938,210 B2
(45) Date of Patent: May 10, 2011

(54) WHEEL-EMBEDDED SUSPENSION

(75) Inventors: Patrik Alwin Künzler, Cambridge, MA (US); Peter Schmitt, Loef-Katttenes (DE); Raul-David V. Poblano, Somerville, MA (US); Brian Chan, Cambridge, MA (US); Philip A. Liang, Cambridge, MA (US); Franco H. Vairani, Cambridge, MA (US); Axel Kilian, Cambridge, MA (US); Ryan C Chin, Boston, MA (US); William J. Mitchell, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 60 days.

(21) Appl. No.: 11/153,601

(22) Filed: Jun. 15, 2005

(65) Prior Publication Data
US 2006/0012144 A1 Jan. 19, 2006

Related U.S. Application Data

(60) Provisional application No. 60/579,972, filed on Jun. 15, 2004.

(51) Int. Cl.
*B60K 17/14* (2006.01)
*B60G 9/00* (2006.01)
*B62D 7/18* (2006.01)

(52) U.S. Cl. .......... 180/65.51; 180/65.6; 280/124.1; 280/93.512; 267/68

(58) Field of Classification Search .......... 280/65.5, 280/65.2, 65.6, 79.4, 86.751, 93.502, 93.512, 280/124.1; 267/68; 180/65.5, 65.2, 65.6, 180/65.51
See application file for complete search history.

(56) References Cited

U.S. PATENT DOCUMENTS

| | | | | |
|---|---|---|---|---|
| 1,041,097 A * | 10/1912 | Kennedy | ........... | 280/124.126 |
| 3,578,354 A * | 5/1971 | Schott | ........... | 280/124.126 |
| 6,113,119 A * | 9/2000 | Laurent et al. | ........... | 280/124.1 |
| 6,722,459 B1 * | 4/2004 | Wendl et al. | ........... | 180/65.5 |
| 2005/0247496 A1 * | 11/2005 | Nagaya | ........... | 180/65.5 |
| 2006/0137926 A1 * | 6/2006 | Taniguchi et al. | ........... | 180/65.5 |
| 2006/0144626 A1 * | 7/2006 | Mizutani et al. | ........... | 180/65.5 |
| 2006/0219449 A1 * | 10/2006 | Mizutani et al. | ........... | 180/65.5 |
| 2006/0272871 A1 * | 12/2006 | Murata | ........... | 180/65.5 |

* cited by examiner

*Primary Examiner* — J. Allen Shriver, II
*Assistant Examiner* — John R Olszewski
(74) *Attorney, Agent, or Firm* — Stephen R. Otis

(57) ABSTRACT

An in-the-wheel suspension system including a drive mechanism for coupling the rotational motion of a wheel rim to the drive shaft of an electric motor and for supporting the wheel rim with respect to the vehicle chassis using one or more springs and dampers. In a hubless version, a spring member supports extend between a frame member attached to the chassis and a bearing member that engages with the rim. In a version used with a wheel hub, the hub is supported by an axle and the spring member supports the axle in movable relation to the frame member. A pivoting support arm that is attached to the axel and pivots about a pivot point attached to the frame member at a location spaced from the wheel axis may be used to support the hub. A Peaucellier linkage may be used to support the axle for movement along a straight line vertical path, the linkage being attached to the frame member at two fixed pivot points. The wheel suspension units perform all the traditional drivetrain functions independently and can be attached to the chassis in a manner that allows for easy removal.

30 Claims, 13 Drawing Sheets

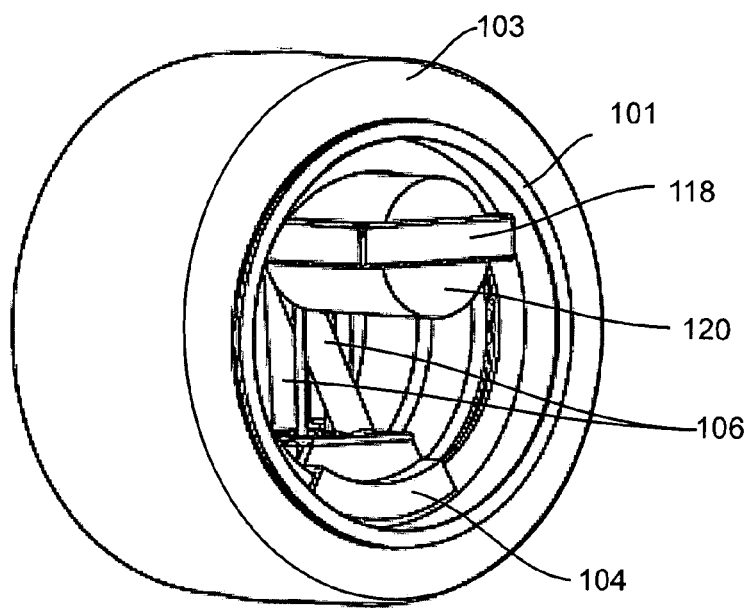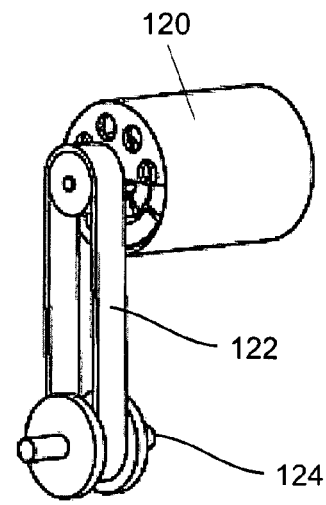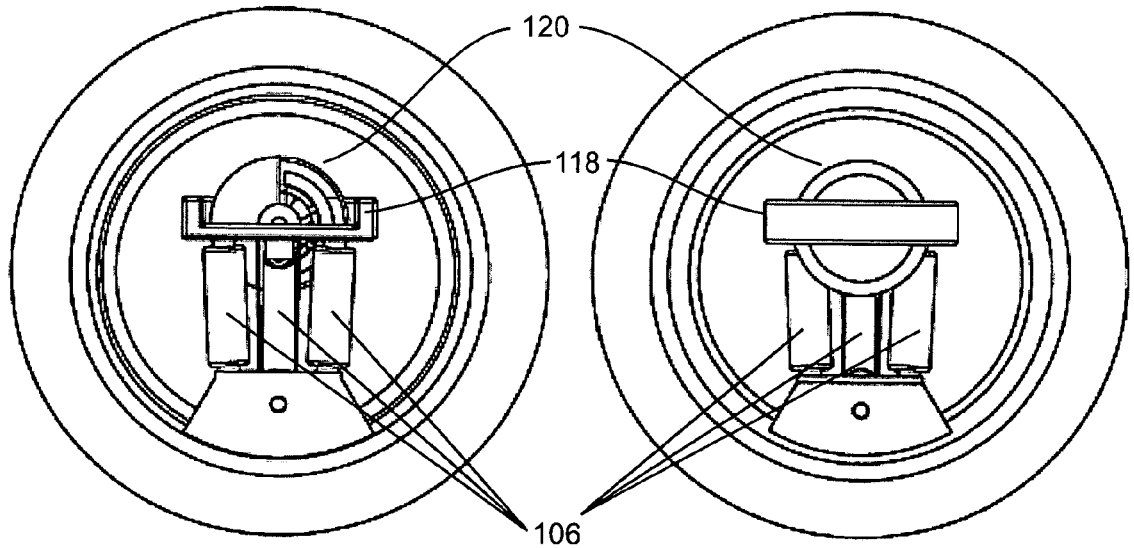
Fig. 1　Fig. 2
Fig. 3　Fig. 4

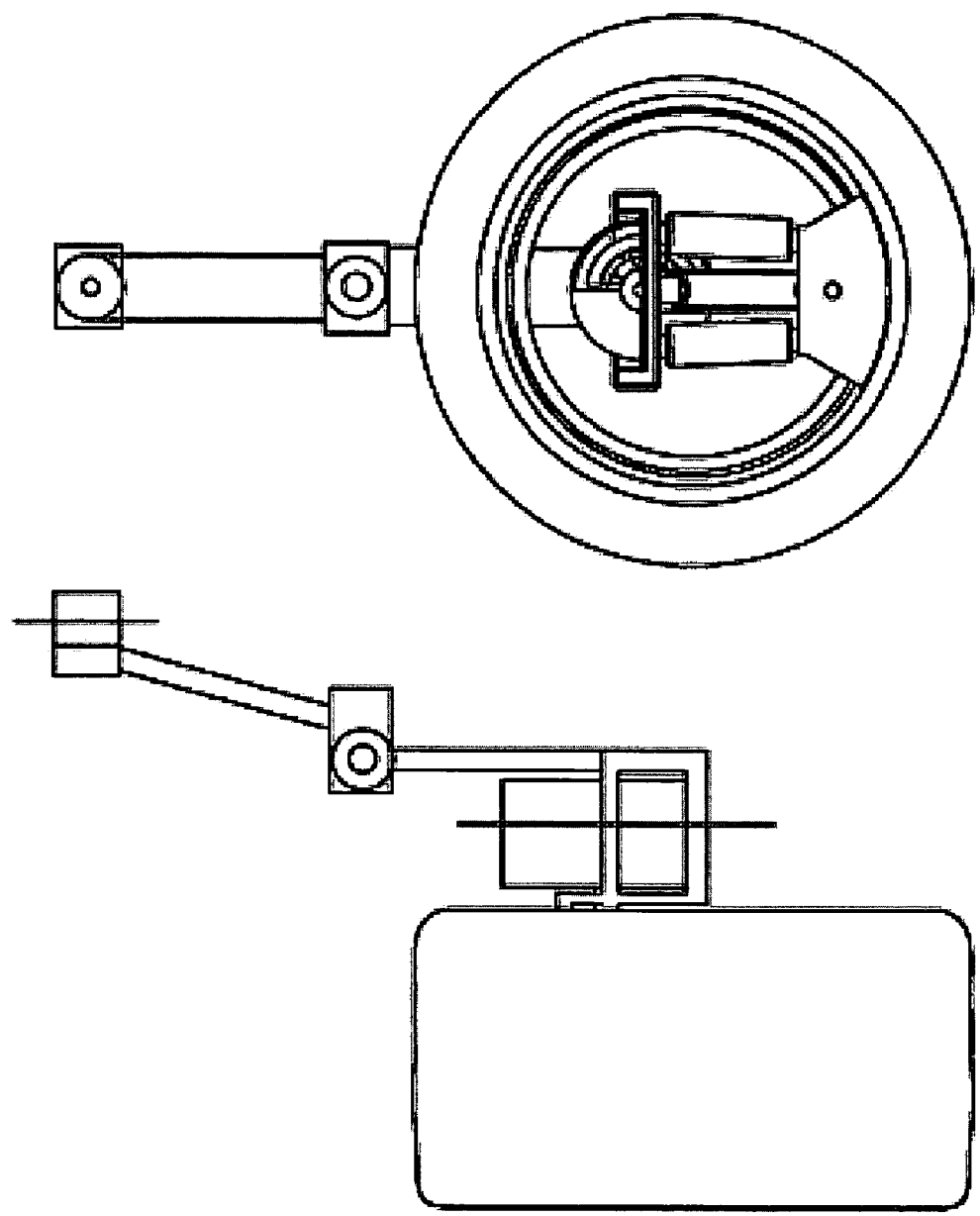

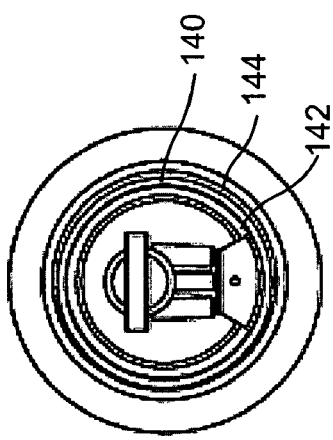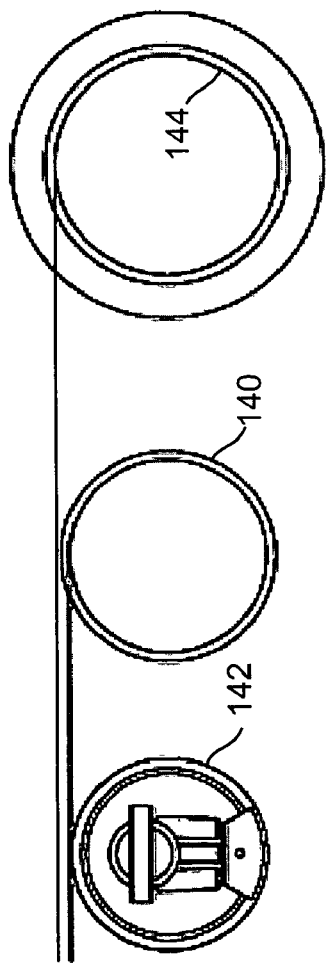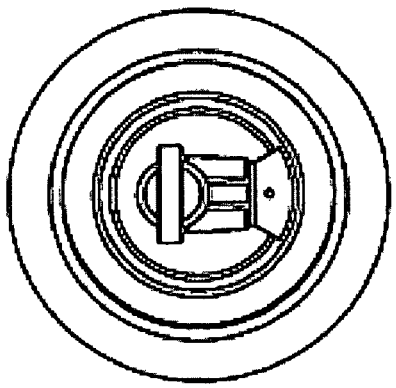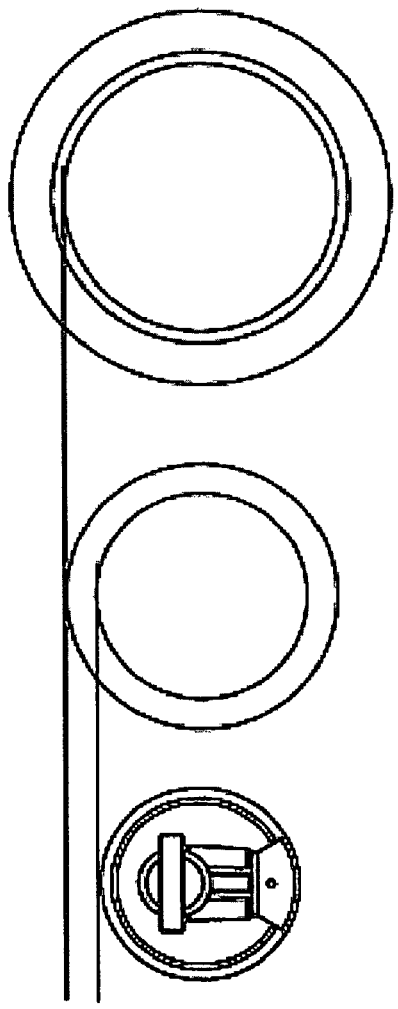

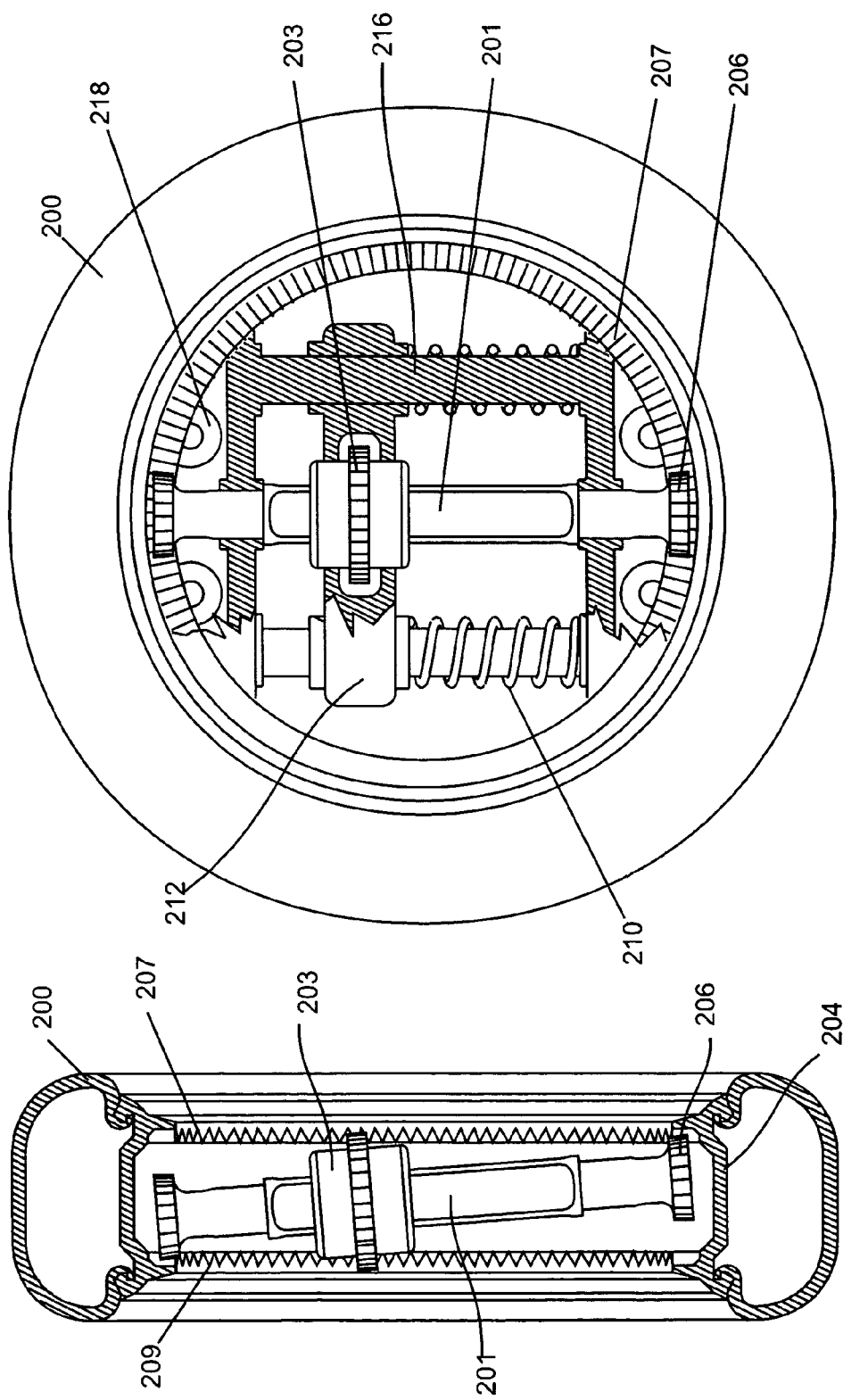

WHEEL-EMBEDDED SUSPENSION

Cross Reference to Related Application

This application is a Non-Provisional of, and claims the benefit of the filing date of, U.S. Provisional Patent Application Ser. No. 60/579,972 filed on Jun. 15, 2004 by Patrik Alwin Künzler entitled "Wheel-Embedded Suspension."

FIELD OF THE INVENTION

This invention relates to vehicle suspension and drive systems.

BACKGROUND OF THE INVENTION

Placing an electric motor on the hub of a motor vehicle results in space savings and better efficiency in power transmission when compared to other motor placements. There are normally significant disadvantages that flow from attaching the motor to the wheel hub. The resulting dramatic increase in unsprung and rotational mass both adversely affect safety and handling. Moreover, the conventional suspension used to support the combined hub and motor assembly uses space very inefficiently.

Because hub-mounted electrical motors add significant unsprung and rotational mass to a suspension, compromising handling and safety, and because motors mounted outside the hub increase the already large requirements of traditional suspensions for space and complicate production, there is a need for an improved suspension and drive mechanism for use with a wheel driven by an electric motor.

SUMMARY OF THE INVENTION

The present invention may be used to advantage to implement a self-contained, single-wheel, electric motor drive and suspension system that can be independently controlled. Such a self-contained "wheel robot" can incorporate every component needed to drive, steer, suspend and lean a car wheel as required in an automobile or other vehicle. Attached to a chassis with a minimal number of connection points, these self-contained wheel robots only require electrical power and driving data to propel a vehicle. The availability of such a self-contained wheel robot can radically simplify car design, especially chassis design and engineering which become much easier, faster and cheaper because the chassis no longer houses components such as the motor, drive shaft and gear box.

Instead of a rigid chassis holding the wheels in place, a central or distributed computing system may be used to coordinate the action of the wheel robots to perform that function. Using position sensor or the like, the computing system can control any number of wheel robots that work together to drive a vehicle or a set of connected vehicles so that each wheel is positioned relative to the others in a desired configuration, such as at the corners of a square where the wheels are typically positioned by a rigid automobile chassis. Using independently controlled and positioned wheel robots, the control system can be designed such that it directs those wheel robots to maintain that square, without the need for a rigid mechanical link to perform that function.

The present invention reduces the unsprung and rotational mass arising from the placement of an electric motor at the wheel hub of a motor vehicle while maintaining the significant space advantages that this motor placement provides.

As contemplated by the invention, the suspension, power transmission and braking components and, optionally, the motor, are mounted inside a hubless wheel so that the motor is not part of the unsprung mass. Alternatively, a hub can be used, as long as above mentioned advantages are maintained.

The wheel-embedded suspension drastically reduces space requirements compared to conventional suspension systems. Unsprung mass and rotational mass are significantly reduced, greatly improving safety and handling.

Forces are attacked where they are generated, allowing for lighter components, more precise suspension control (ride, handling, steering axis, reducing tire wear), and controlling different suspension aspects (camber, castor, toe in, ride height, steering angle, springing, damping) independently from each other. Therefore, steering, acceleration, and deceleration loads can be distributed equally to all wheels of the vehicle, increasing its balance, its limits of adherence to the road and therefore safety.

Independent toe in, castor, and steering control makes the suspension work equally well in the "forward" and "reverse" direction at any speed. The steering axis may be positioned in the center of the tire contact patch or at the linkage point between the suspension and the chassis, or both, permitting the construction of a truly omni directional vehicle.

Attached to the chassis with "legs", the wheel-embedded suspension combines excellent on-road performance, economy, and speed with off road capabilities.

The suspension mounting points are designed so that changing a wheel/suspension unit is a easy as changing a tire on a typical car, and such suspension units can be produced, stored, and repaired independently form the rest of the vehicle.

The functions performed by the suspension unit may be controlled electronically, further permitting units to be used on different vehicles by electronically adapting these functions according to the vehicle's dimensions, weight, and weight distribution. Placing the suspension, drivetrain and motor inside a (hubless) wheel results in tremendous space savings compared to conventional suspension systems, even when the electric motor is placed inside the hub of the wheel.

Placing the motor placement inside the rim is more energy and space efficient while placing the motor outside the wheel allows maximum suspension travel, allows a larger motor to be used, and creates the opportunity but is not a prerequisite for a second steering axis controlled by a second motor.

By attaching the wheel-embedded suspension to actively movable legs, the behavior of the system may be dynamically controlled to provide improved on-road speed and handling with excellent off-road capability.

In one embodiment, suspension springs and dampers connect a motor mount rigidly attached to the chassis to one or more members that engage with the wheel rim and a belt, chain or other mechanism transmits rotational forces between the wheel rim and the motor. The drive mechanism can take the form of a transmission shaft one or both ends of which engage with a rim gear that slidably engages with a motor gear that engages with the chassis-mounted motor while permitting the drive shaft to move with the wheel.

In other embodiments, the wheel is attached to a support arm that pivots about an axis off-center axis positioned near the wheel rim and spaced from the axis of rotation of the wheel, and the motor drives the wheel directly or through a rim gear at the off-center pivot point, or via drive shaft at the pivot point that transmits power to the wheel. Alternatively, the wheel axis may be supported by a Peaucellier linkage that is attached to the motor mount at fixed points and constrains the wheel axis to move along a straight line vertical path.

The ability to move each wheel independently in both direction and steering angle results in an omni-directional vehicle with the steering axis located either in or outside the wheel, or both.

These and other features and advantages of the invention may be more clearly understood by considering the detailed description which follows. In the course of this description, frequent reference will be made to the attached drawings which are summarized below.

BRIEF DESCRIPTION OF THE DRAWINGS

FIG. 1 is a perspective view of a hubless suspension mechanism embodying the invention;

FIG. 2 is a perspective view of a belt-drive for applying power to the wheel from a hub-mounted electric motor;

FIG. 3 is a side elevational view of the suspension system viewed from the outside of the wheel;

FIG. 4 is a side elevational view of the suspension system viewed from the inside of the wheel;

FIGS. 13 and 14 are front and side elevational views respectively showing the manner in which the motor support frame may be attached to a movable legs connected to a vehicle chassis;

FIGS. 15-22 are side wheel views showing how wheel adapters may be used to allow a single suspension unit to be used with wheels of different sizes;

FIGS. 23 and 24 are cross-sectional front and side views respectively showing an alternative drive mechanism for exchanging motive forces between an electric motor and a wheel;

DETAILED DESCRIPTION

An in-the-wheel, hubless suspension mechanism shown in FIGS. 1-8 controls suspension movement, such as, springing, damping, and optionally, steering, camber, castor, toe-in and toe-out. The suspension system is placed inside a hubless rim 101 on which a tire 103 can be mounted. The suspension mechanism is partially or completely contained inside the space of the hubless rim 101.

Figure 8:
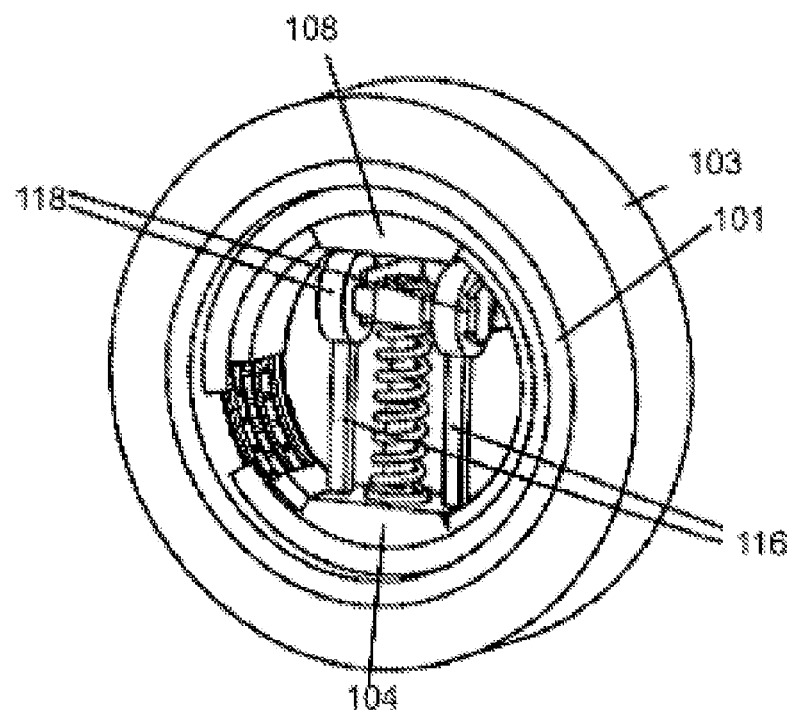
FIG. 8 is a perspective view of the in-the-wheel, hubless suspension system.
Figure 9:
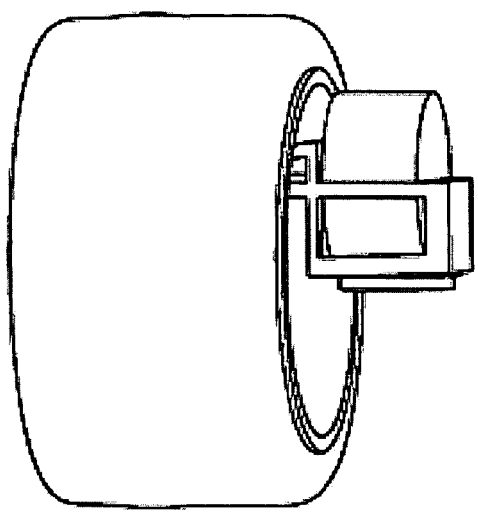
FIG. 9 is a perspective view showing the motor and mounting frame arrangement used to provide steering.
Figure 10:
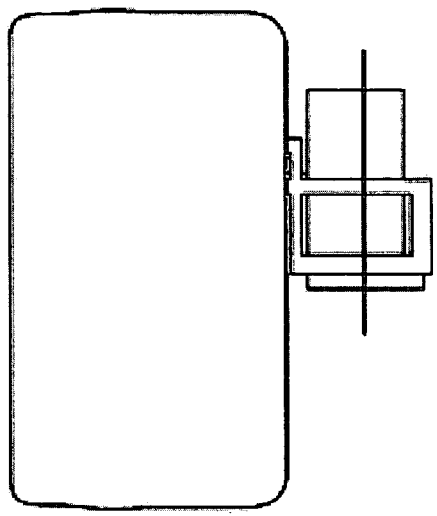
FIGS. 10, 11 and 12 are side, top and bottom views respectively of the wheel and drive motor mounting frame adapted for steering about an external steering axis.
Figure 11:
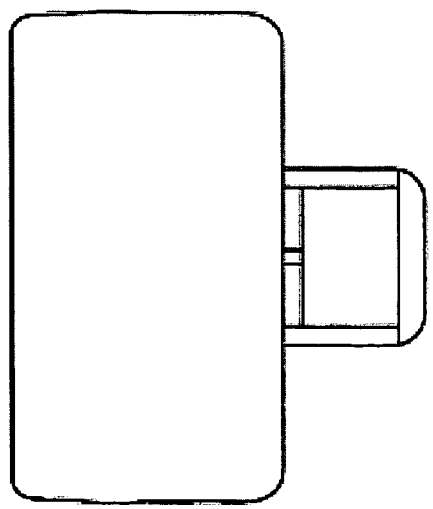

Ideally, the suspension mechanism consists of three active suspension elements mounted to a bracket 104 at the bottom of the hubless wheel. The three active elements seen at 106 provide the forces needed to meet all the requirements for springing and damping while providing all degrees of freedom necessary for steering, toe in, toe out, camber, and castor. Alternatively, two brackets, one at the top (at 108) and one at the bottom (at 104), can connect to the rim of the hubless wheel as seen in FIG. 8. The brackets 104 and 108 are connected by two guides, seen at 116 in FIG. 8. The sprung mounting frame 118 which is rigidly attached to the chassis travels vertically on the guides 116.

If desired, the components of the assembly can be designed so that the steering axis goes through the center of the contact patch of the tire 103, placing the tire in the optimal position relative to the road at all times, independently of the degree of steering, suspension travel, or vehicle roll and yaw. If desired, steering related functions, springing, damping, ride height, camber and castor, can be controlled independently from each other using the active components 106.

The in-the-wheel suspension system attaches to the rim 101 by means of one (or several) clamping mechanisms 104 so that the hubless rim 101 and the tire 103 can rotate around their virtual axis relative the clamp 104 and the suspension mechanism but are otherwise rigidly connected to clamp 104.

Figure 12:
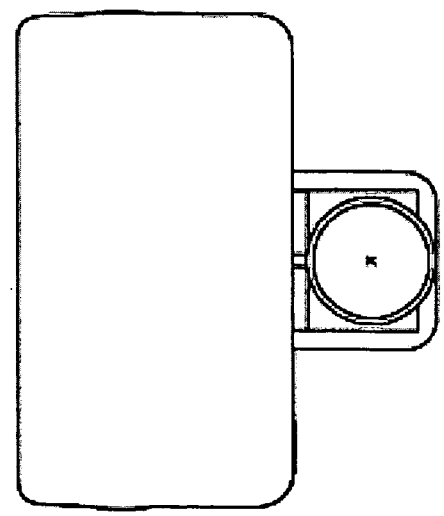

One side of a support 118 attaches to the suspension components 106 so that support 118 is not part of the unsprung mass. The other side of support 118 connects to the vehicle chassis either by means of a rigid connection or by a mechanism for adjusting castor and/ or ride height, or by a steering mechanism illustrated in FIGS. 9-12 located partially or completely outside the mechanism of the hubless wheel, or by means of a leg-like mechanism seen in FIGS. 12 and 14.

Figure 6:
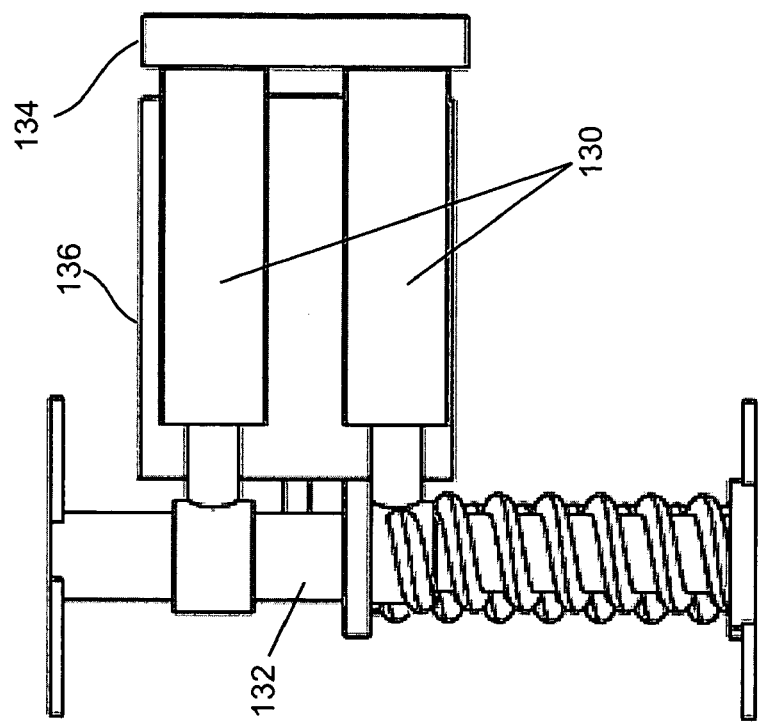
FIGS. 5 and 6 are perspective and side views of the motor and motor support frame.
Figure 5:
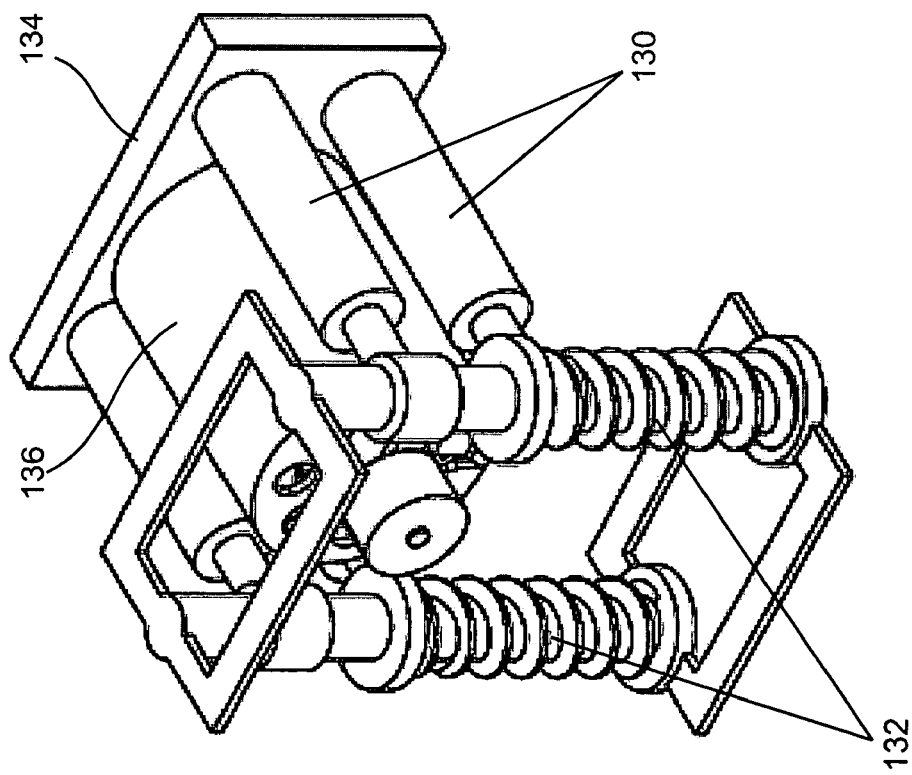
Figure 7:
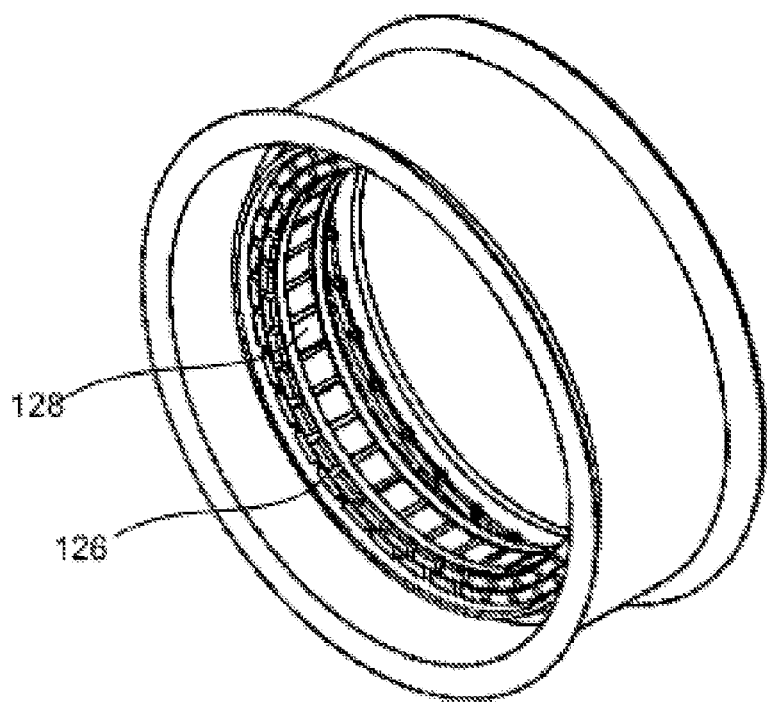
FIG. 7 is a perspective view of the wheel rim with a rim-mounted motor.

A drive motor 120 is connected to the support 118. Drive motor 120 is placed either completely, partially, or not at all inside the space of the hubless rim. A flexible power transmission mechanism (e.g. the belt drive see at 122 in FIG. 2), which is designed to function under suspension travel and steering movement, such as a belt with a tensioner, transmits power from the drive motor 120 to the drive mechanism 124 (FIG. 2) which is connected to the drive clamp(s) 104 and transmits power to the rim 101. If minimal power transmission losses are desired, the motor can be hub-mounted as shown in FIG. 7 so that the rotating components 126 of the motor rotate around the virtual axis of rim 101, either as part of rim 101 or rigidly attached to rim 101, while the stator elements 128 of the motor do not rotate around the virtual axis of rim 101.

Other drive train options may be used, including: a variable-length driveshaft, a chain drive, a hydraulic drive, a scissor mechanism drive, a pneumatic muscle type drive, and others. Selected preferred drive and in-the-wheel suspension mechanisms having particular advantages include the triangular drive shaft arrangement described below in connection with FIGS. 23-29, the direct drive hinged system shown in FIG. 20, an off-center axis drive system shown in FIGS. 31-33, and an arrangement using a Peaucellier linkage that supports the wheel axis for straight line vertical motion as described in connection with FIGS. 34-36.

Braking forces are generated in one or both of two ways: by regenerative braking in the motor and by a brake disc mounted inside the wheel rim, with friction pad actuators located in the bottom bracket mechanism 104. If desired, the drive mechanism, the power transmission mechanism, and the electric drive motor can be used to slow the rotation of wheel by regenerative braking, and the electricity resulting from this process can be either used directly, or it can be (temporarily) stored one or more batteries or capacitors.

Braking can also be achieved by increasing the mechanical friction between the clamping mechanism in the bracket 104 and the rim 101, either by means of a mechanism contained in clamp 104 or by means of a brake disc (not shown) attached to the inside face of rim 101. In case two clamps 104 and 108 are uses as illustrated in FIG. 8, they can be connected by one or more rigid elements 116 and these in turn connect to the vehicle chassis by the support 118.

If desired, the support 118 or the clamping mechanism(s) in the bracket(s) 104 can incorporate control functions for steering, toe-in, toe-out, and camber in a way that the position of the tire relative to the ground is optimal at all times. As illustrated by the mechanism shown at 130 in FIGS. 5 and 6, active actuators may be used to orient the suspension supports 132 relative to the chassis mount 134. The actuators 130 located at the connection bearings where the four arms connecting to the motor/chassis hold the two vertical guides 132 and perform all directional functions and adjustments (camber, etc). During suspension travel, the arms carrying the actuators 130 and the motor 136 remain stationary respective to the chassis at mount 134. This configuration provides the following advantages:

(1) space savings;
(2) lower unsprung and rotational masses;
(3) exact suspension geometry;
(4) weight savings: since the forces are being attacked where they are being generated, the suspension components can be much lighter than in conventional suspensions;
(5) steering: the steering axis is in the ideal place; and
(6) independent electronic control of every wheel can improve braking and acceleration characteristics in comers and emergencies.

Since the forces are being attacked where they are being generated, they can be handled much more precisely than in conventional suspensions. castor, camber, ride height, springing, damping, and the steering axis can be controlled precisely and independently from each other at all times.

All mechanical functions of the assembly are preferably controlled electronically in a manner that results in optimal wheel position and acceleration at all times. The mounting point(s) to the vehicle are designed so that the complete wheel assemblies can be attached and detached to the vehicle rapidly and with simple means. The electronics are designed so that a given wheel assembly can function optimally for different vehicles with different weights and different dimensions at all times. The mounting point of the wheel-embedded suspension to the chassis is made in a way that the suspension unit can be removed or exchanged very easily, comparable to changing a tire on today's typical road or racing cars.

As illustrated in FIGS. 15-22, to save costs, an adaptor, such as the adapter 140 seen in FIG. 16, can be used to fit a mechanism of standard size (seen at 142 in FIG. 15) to a wheel of large inside rim diameter seen at 144 in FIG. 17. The resulting assembly is seen in FIG. 18. FIGS. 19-22 show how a larger adapter can be used to fit the standard in-the-wheel suspension assembly to an even larger wheel using a larger adapter seen in FIG. 20. Alternatively, a different clamping mechanism 104 may be used with different sized rims fitting different size tires, with each clamping assembly being designed to mate with a standard size suspension mechanism.

Steering: The in-wheel steering axis may advantageously pass through the center of the wheel's contact patch. This reduces steering forces and reduces tire wear. Since the steering of all four wheels is independently controlled, the vehicle can travel diagonally while facing "forward". The external steering axis increases the possibilities for wheel articulation, enabling the vehicle to travel in any direction on the XY plane.

By independently controlling the speed and direction of the driving motor, as well as of the in-wheel steering mechanism and the external steering mechanism on all wheels, very precise control of direction, braking, and acceleration may be achieved, especially in corners. For example, the inside wheels can brake a little more, or the outside wheels can accelerate a little more.

The control mechanism for any number of wheel robots working in conjunction to drive a vehicle can be designed so that said wheel robots know their relative positions and are able to maintain or change their relative positions in spacial and temporal patterns given specified by the control system. Instead of a (rigid) chassis providing the positioning of the wheel robots relative to each other, the control system drives each wheel robot so that desired spatial positions can be achieved at any point in time.

The motor placement options include:
(1) the motor may be placed next to and inside the rim;
(2) the motor may be placed next to the chassis or connectors to the chassis, (partially) inside the wheel space;
(3) the motor may be placed next to the chassis-connectors, outside the wheel space (as seen in FIGS. 9-12), with an additional motor (not shown) for steering control with an external steering axis relative to the wheel such that the drive and steering operate under independent electronic control at each wheel; or
(4) the motor can also be placed next to the rim, inside the wheel space.

Other Drive Mechanisms

There are additional ways to bring power from the sprung motor (which does not travel with the wheel or move with the suspension) to the unsprung wheel, which follows the road and therefore travels relative to the motor.

Figure 25:
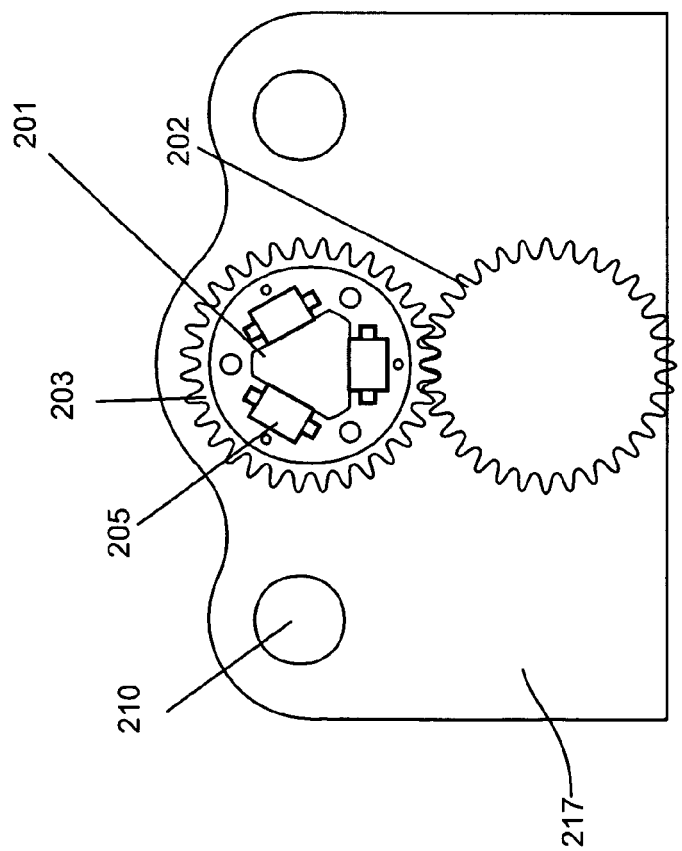
FIG. 25 is a top view showing the bearing and gear assembly used to couple power between a motor and the drive shaft seen in FIGS. 23 and 24.

A second embodiment described in connection with FIGS. 23-29 employs a triangular shaft 201 that transmits power from the motor to the wheel 200 from an electric motor (not shown) transmits power to the shaft 201 via a gear assembly 203 that is rotated by a motor drive gear 202 seen in FIG. 25. The bearing assembly houses three bearings (seen at 205 in FIG. 25) which make contact with the triangular shaft 201, allowing little play between the bearing assembly 203 and the shaft 201 so that power may be transmitted, but allowing the shaft 201 to rotate with the bearing assembly 203 about the shaft axis, and also allowing the shaft 201 to move longitudinally along the axis of the triangular shaft 201. In this way, the shaft 201 can travel along its longitudinal axis relative to gear assembly 203, and hence relative to the motor and chassis, as the wheel rim 204 moves up and down. One or both ends of the triangular shaft 201 form a gear as seen at 206 in FIG. 23 that engages with a crown gear 207 that is attached to the rim 204, thereby transmitting power between the shaft 201 and the rim 204. This mechanism allows transmission of power both from the motor to the wheel and from the wheel to the motor during deceleration when energy is regeneratively returned to the battery from the electric motor that acts as a generator.

As seen in FIG. 23, the triangular shaft 201 is aligned at a slight angle with respect to the vertical, allowing the two ends of the shaft to engage with one of the two crown gear 207 and 209. The suspension supporting springs, one of which is indicated at 210 in FIG. 24, are aligned parallel to the triangular shaft 201. As the wheel moves up and down during vehicle travel, the entire wheel and hub assembly move laterally by a slight amount with respect to the sprung chassis as the triangular shaft 201 moves up and down through the bearing assembly 203.

Figure 27:
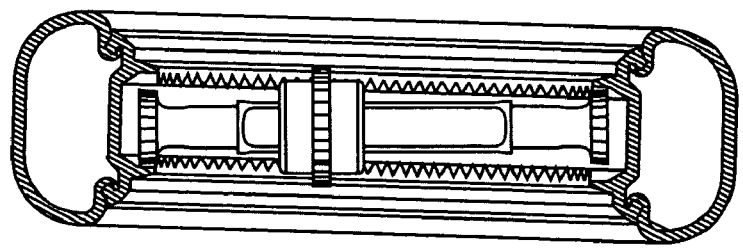
Figure 26:
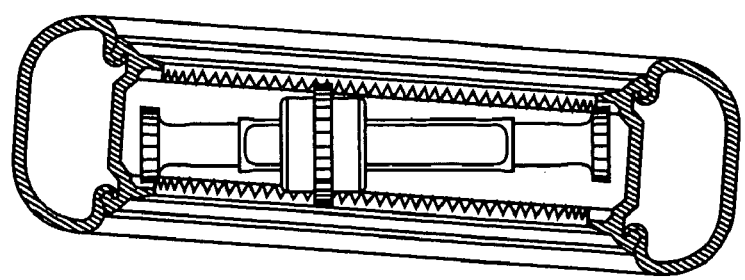

Alternatively, as shown in FIG. 26, the wheel may be tilted at an angle so that the camber is equal to the tilt of the shaft with respect to the wheel. Any additional camber would be added by adjusting the suspension system (tilting the motor, etc) using a mechanism of the type shown in FIGS. 5 and 8. As seen in FIG. 27, the angle of tilt can be designed to be very small (less than two degrees).

Figure 29:
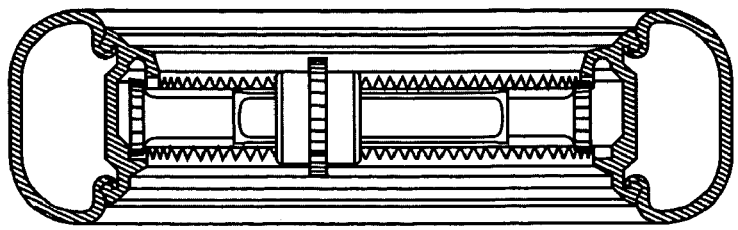
FIGS. 26-29 are cross-sectional views showing alternative methods for coupling a vertical drive shaft to the wheel rim in an arrangement of the type shown in FIGS. 23-25.
Figure 28:
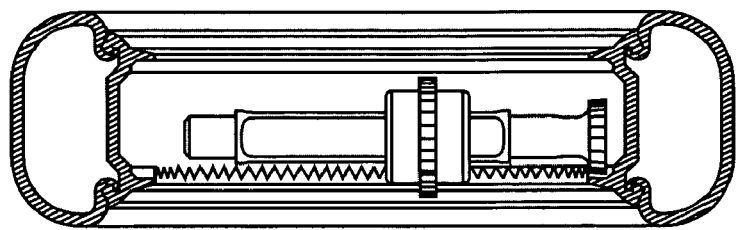

To totally eliminate lateral movement, the triangular shaft may be aligned vertically, and employ only one shaft gear and rim gear as seen in FIG. 28, or the two rim gears 207 and 209 on the inner and outer sides of the hub may be of different diameters so that each shaft-end gear engages with one of the rim gears but is vertically displaced from the other rim gear as illustrated in FIG. 29.

The drive arrangements shown in FIGS. 26-29, as with the drive arrangements described above in connection with FIGS. 1-25, employ suspension springs and dampers seen at 210 in FIG. 24. The springs/dampers 210 support a sprung motor mount 212 and extend between the upper and lower portions of a bracket frame 216. The bracket frame 216 engages with the inside of the rim via the roller bearings 218. The triangular drive shaft 201 is journaled to a supportframe 217 which holds it in proper position so that its end gears engage with the rim gears.

Figure 30:
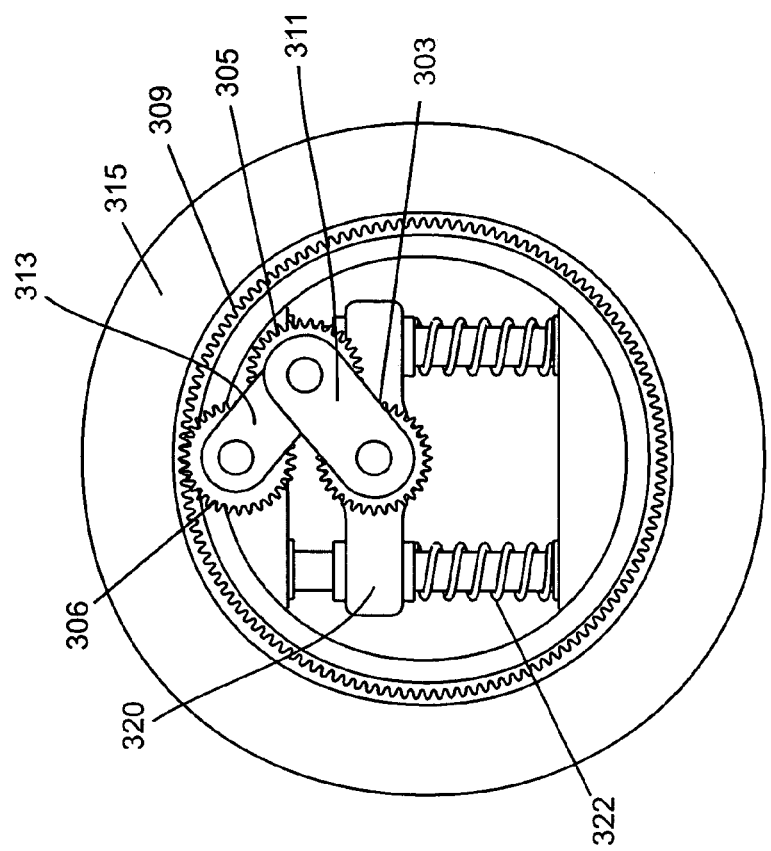
FIG. 30 is a side elevational view showing another alternative drive mechanism for coupling a motor and wheel rim.

A third embodiment shown in FIG. 30 employs three drive gears 303, 305 and 306 arranged in a triangular formation so that one gear 303 (the motor gear) is driven by the motor and transmits power to a middle gear 305 which in turn transmits power to a third gear 306 (the rim gear) which is in constant contact with and engages the crown gear 309 attached to the rim. The angle between the links 311 and 313 which support the gears, and therefore the distance between the motor gear 303 and the rim gear 306, is variable, allowing the gears to be continuously engaged and deliver power during up and down travel of the wheel 315. The motor gear is rigidly attached to the sprung frame member 320 that is supported by the springs 322.

Off-center Traveling Suspension Axis

Figure 31:
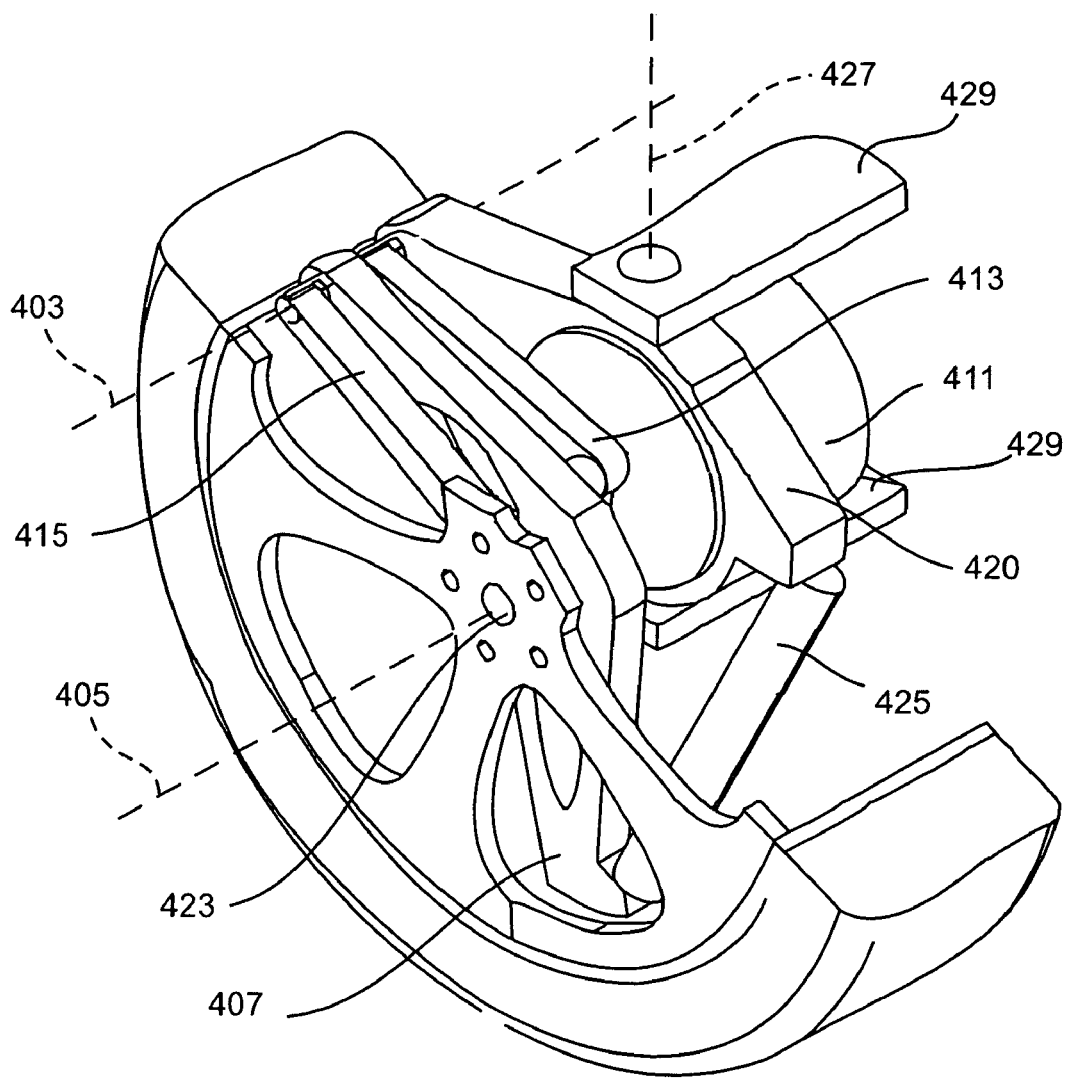
FIG. 31 is a perspective view of an in-the-wheel suspension system employing an off-center pivot axis for supporting and driving the wheel at the axis of the wheel hub.
Figure 32:
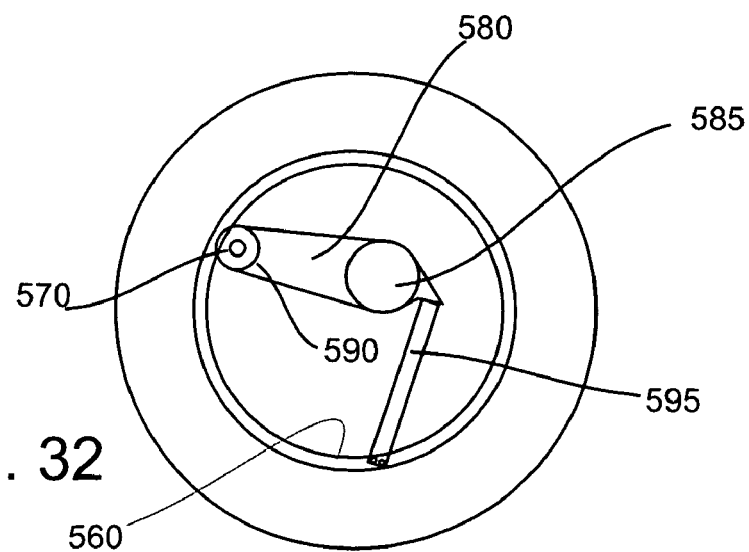
FIG. 32 is a schematic view showing an alternative configuration for an in-the-wheel suspension system using an off-center pivot axis in a hubless system.

As more components are added to the hub or the unsprung portions of the suspension, unsprung mass increases. The arrangements described above suspend the tire and the rim in a way that allows maximum suspension travel while keeping all other components (motor, drive-force transmission, steering, suspension and activators) inside the wheel stable and consequently sprung. The fourth embodiment shown in FIGS. 31 and 32 employ an off-center suspension traveling axis indicated along the dashed line 403 as shown in FIG. 31. The axis 403 sitting near the rim and outside the wheel center axis 405 allows the wheel to travel up and down as the support arm 407 pivots about the off-center axis 403. The advantage of this wheel suspension design is that the suspension axis can easily be used to drive the wheel directly or function as the drive force transmission axis. As seen in FIG. 31, the shaft of the drive motor 411 drives the belt 413 which is coupled to a drive shaft that rotates about the off-center axis 403 and in turn drives the wheel hub using a second drive belt seen at 415.

This suspension mechanism uses a single simple mechanical link, the pivoting support arm 407. The motor support member seen at 420 is rigidly attached to the chassis and supports both the motor 411 and the pivot shaft at off-center suspension axis 403. The pivoting support arm 407 and the motor 411 are thus supported inside the wheel hub and all of the attached components remain stable. The wheel hub rotates about a shaft at 423 journaled by ball bearings to pivoting support arm 407. The hub drive shaft 423 is driven by the drive belt 415. When the wheel hits a bump, the wheel axis at shaft 423 is urged upwardly and the pivoting support arm 407 pivots upwardly about the off-center axis 403, compressing a support spring/damper at 425. Alternatively, one or several rotational springs and/ or dampers can be located on or near off-center axis 403.

Steering can be achieved by rotating one or several support members 420 relative to chassis connectors 429 around steering axis 427. Steering axis 427 may or may not pass through the center of the contact patch, and steering axes as shown in FIGS. 9 to 12, as well as movable legs, as shown in FIGS. 13 to 14, may or may not be employed. The movable legs shown in FIGS. 13-14 may be coupled to actuators (not shown) which permit the position and orientation of the steering axis, and the location of the wheel relative to the chassis, to be moved to change the handling characteristics of the vehicle.

Camber and castor may be achieved by moving the mounts of steering axis 427 relative to chassis connectors 429. Alternatively, camber can be achieved by having two parallel support members 420, rotating in conjunction around a common steering axis 427 for steering, and rotating independently around the virtual center axis of motor 411, thereby tilting off-center axis 403 relative to motor 411 and chassis connectors 429.

Figure 35:
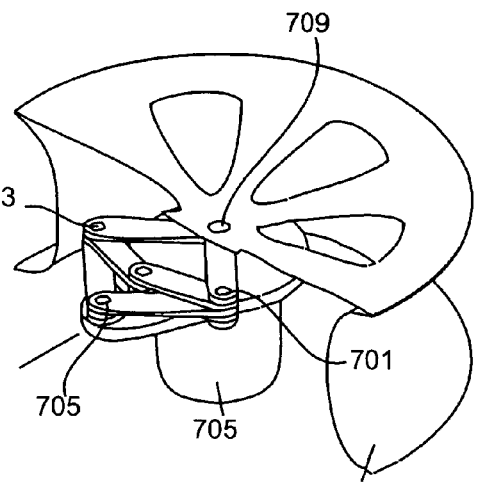
FIG. 35 is a perspective view illustrating the construction of a suspension system that uses an in-the-hub Peaucillier linkage to support a wheel axis for motion along a vertical straight line path.

In an alternative "hubless" arrangement illustrated in FIG. 35, an inner rim 560 is positioned inside and is separated from the wheel rim by roller bearings (not shown). The entire wheel and the inner rim 560 pivots about the off-center suspension axis seen at 570. A mounting bracket at 580 is rigidly attached to the chassis and to the motor seen at 585. A drive gear 590 rotates about the off-center axis 570 to engages with and drive a rim gear (not shown) rigidly attached to the outer wheel rim. The drive gear 590 is driven by the motor 585 by a belt, gears, or the like (not shown). A support spring/damper at 595 is compressed when the wheel pivots upwardly about the off-center pivot axis 570.

Figure 34:
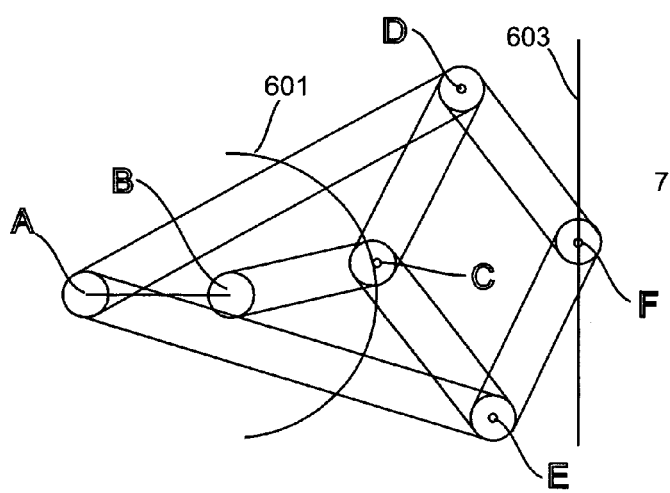
FIG. 34 is a schematic diagram illustrating how a conventional Peaucellier linkage mechanism translates rotational motion about two fixed pivot points into straight line motion.

Both designs seen in FIGS. 34 and 35 thus include an off-center suspension axis and drive shaft combination and both form a self-contained wheel robot with an off-center axial traveling suspension using the suspension axis as the drive shaft (as in FIG. 35), or as the drive-force transmission shaft (as in FIG. 34).

Figure 33:
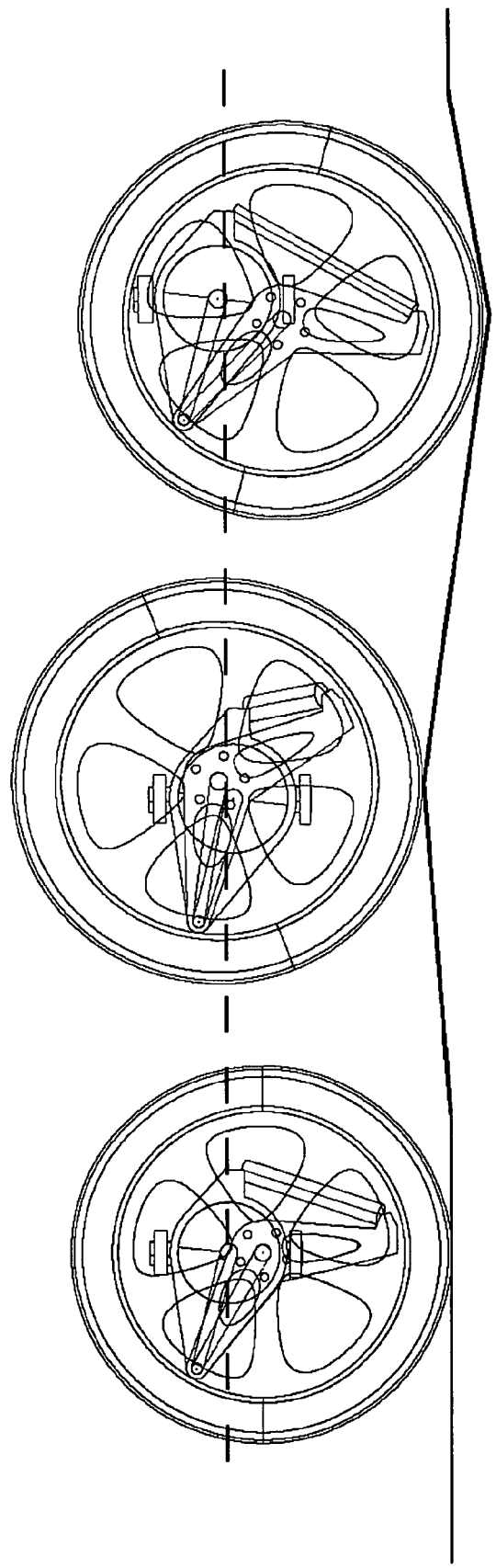
FIG. 33 is a side elevational view showing three positions for a suspension system of the type shown in FIG. 31 as the wheel moves up and down relative to the chassis.

FIG. 33 shows how the off-center suspension moves relative to the wheel as the vehicle is driven over an uneven surface. Comparing the wheel position at the left with the elevated wheel position in the center, it can be seen that the support arm (seen at 407 in FIG. 31) pivots upwardly, compressing the spring/damper, as the wheel moves up. The wheel position at the right has dropped, pivoting the support arm in a clockwise direction about the off-center pivot point, and the support spring is fully elongated. Thus, as the wheel pivots vertically when the vehicle is driven over an uneven surface, only the tire, rim and hub (if a hub is used), and the pivoting support arm move, thus minimizing the unsprung mass.

Peaucellier Suspension Mechanism

Figure 36:
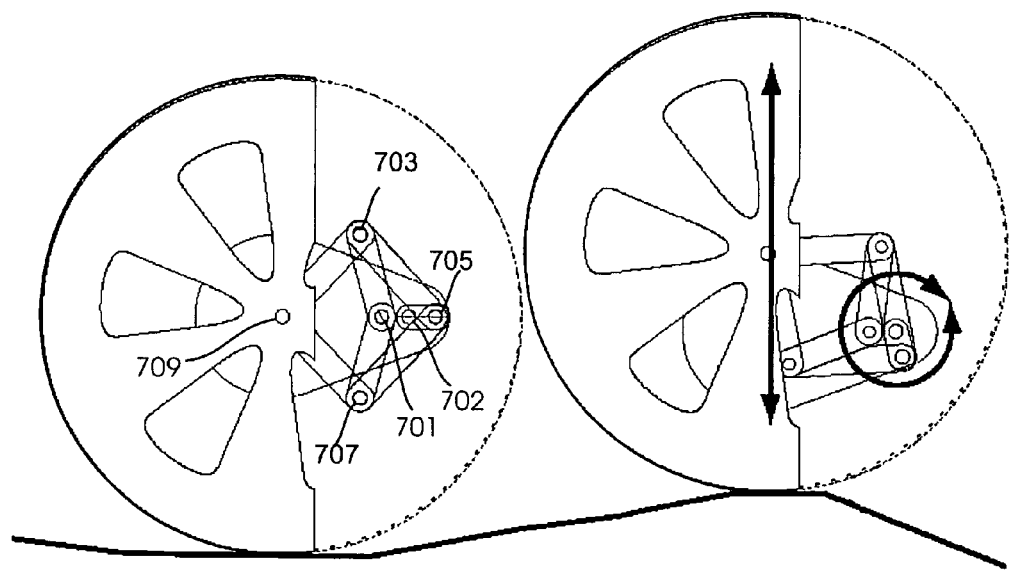
FIG. 36 is a side elevational view showing two positions for a suspension system of the type shown in FIG. 35 as the wheel moves up and down relative to the chassis as the vehicle is driven over an uneven surface.

The embodiment of the invention shown in FIGS. 34-36 employs a Peaucellier mechanism to support the axis of a wheel hub at two fixed pivot points by an arrangement of links. The Peaucellier mechanism is described in "Mechanisms, Linkages, and Mechanical Controls", edited by Nicholas P. Chironis, published by McGraw-Hill, Inc. 1965; and "Ingenious Mechanisms For Designers and Inventors", Vols. I and II, edited by Franklin D. Jones, The Industrial Press, 1935. In one illustrative form shown in FIG. 34, the mechanism consists of seven pieces or links joined at the points designated by the letters A-F. There are two long links AD and AE of equal length, four short links that form a rhombus CDEF, and a link BC which pivots about a fixed point B. The points A is also fixed. The point C is thus constrained by the link BC to move in a circular path indicated at 601 about point B as the link BC rotates. The remaining links constrain point F to move in along a straight line path 603.

Rotary motion of arm BC around Point B is thus translated into vertical motion of Point F. Point A can also lie within the parallelogram formed by CEFD, without affecting the function of the mechanism. The resultant linear motion of point F is along a true straight line, not just an approximation as it is for other mechanisms such as the well known Watt linkage described, along with other straight line linkage mechanisms, in U.S. Pat. No. 4,545,266 issued to Brems on Oct. 8, 1985 entitled "Straight line linkage." True vertical travel is an important component of suspension system and use of the Peaucellier mechanism accordingly provides an improvement over the pivot arm embodiments seen in FIGS. 31 and 32 which use a pivot point that carries the axis of the wheel hub in along an arc-shaped path.

FIG. 35 illustrates the manner in which a Peaucellier linkage may be used to support a wheel hub axis for straight line vertical motion. The linkage mechanism is attached to the motor mount plate 700 at the two fixed pivot points 701 and 702 as seen in FIG. 36. The motor mounting plate 700 is rigidly attached to motor 706 and the vehicle chassis (not shown). The four links joined at pivot points 703, 705, 707 and 709 form a rhombus (a parallelogram with four equal length sides). The pivot point at 705 is constrained to move in a circular path by the link between point 705 and the fixed pivot point 702. The linkage then constrains the pivot point 709 attached to the wheel hub axis to move along a straight vertical path as indicated by the arrow 711 in FIG. 36 which shows how the linkage moves when the wheel is forced upward as seen at the right when the wheel strikes a bump.

Because all of the links are of fixed length, power can be transmitted from the motor shaft to the wheel using two belts, the first of which connects the motor drive an intermediate shaft which rotates about fixed point 701 and the second of which follows a path around the pivot points 701, 707, 709 and 703. Because these four points are joined by fixed length links, the path length of the belt is fixed. The belt rotationally engages the drive shaft the rotates about point 701 as well as the hub axis that rotates about point 709, and idler pulleys (not shown) at pivot points 703 and 707 maintain the drive belt tension.

A conventional spring and damper (not shown) may be positioned to absorb forces between the fixed motor mount (chassis) 700 and the wheel hub axis at 709. Alternatively, or in addition, one or more rotary springs may be positioned at either or both of the fixed position pivot points 701 and 702. Each such rotational spring absorbs the rotational forces applied between the mounting plate 700 and the link attached at that fixed pivot point.

Alternatively to roller or ball bearings, fluid bearings or magnetic mechanisms may be used to support the hubless wheel. Any bearings or other moving mechanisms may be covered appropriately to protect them from the elements, or to reduce hazards arising from moving parts or parts carrying electricity or generating high magnetic fields.

Control System

Figure 37:
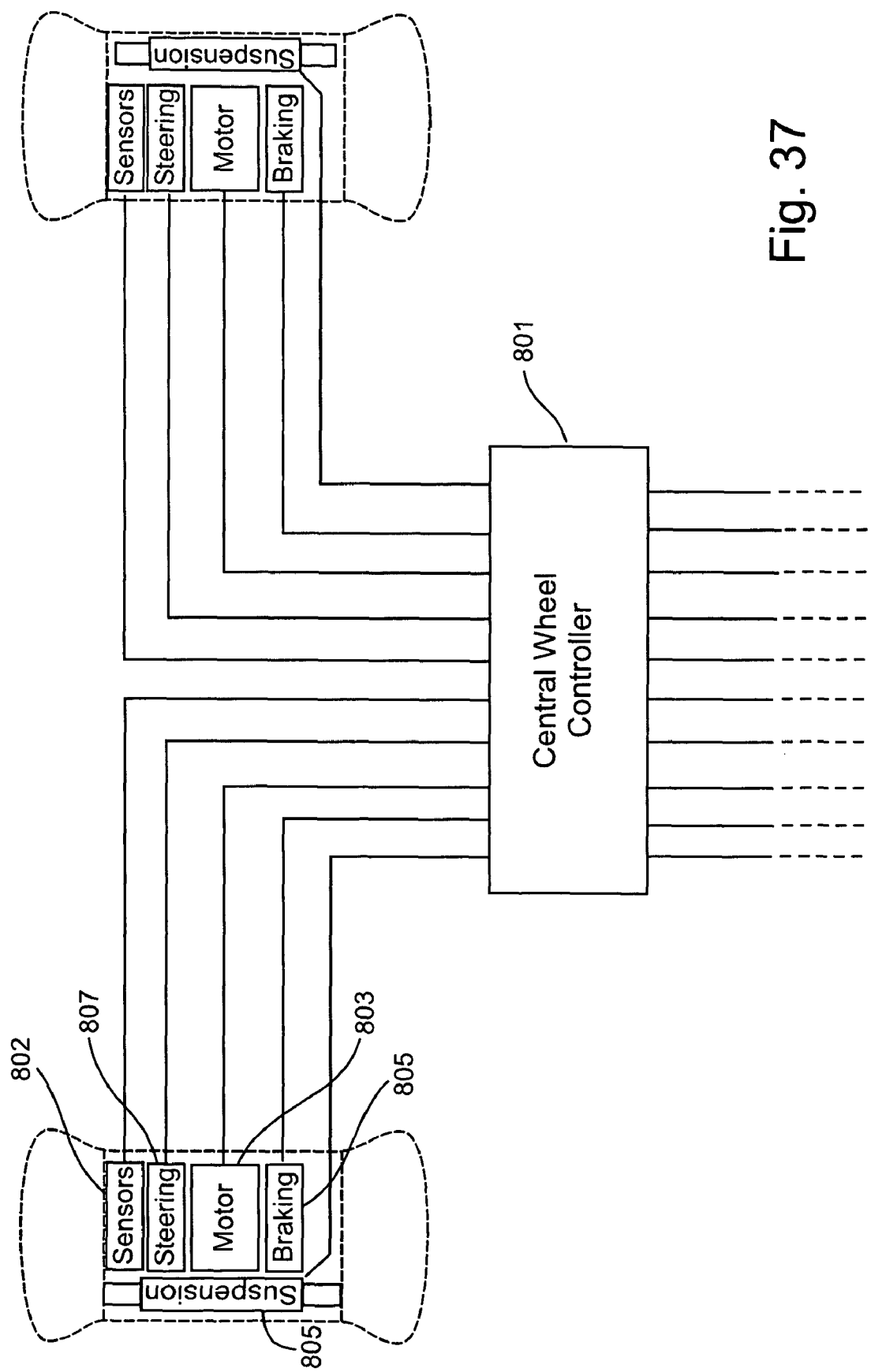
FIG. 37 shows a central controller that delivers control signals to actuators within each wheel robot.

The present invention provides a self-contained, single-wheel, electric motor drive and suspension system that can be independently controlled. Such a self-contained "wheel robot" can used for each wheel of a four wheeled automobile as illustrated in FIG. 37 (or in a two wheeled motorcycle, or a train of articulated multi-wheeled vehicles such as a tractor-trailer-like vehicle). Each wheel assembly incorporates every component needed to drive, steer, suspend and lean a car wheel as required in an automobile or other vehicle. Attached to a chassis with a minimal number of connection points, these self-contained wheel robots only require electrical power and driving data to propel a vehicle. For example, as seen in FIG. 37, a central controller 801 receives signals from sensors 802 located in the vicinity of the wheel (including both displacement sensors and accelerometers for monitoring the dynamic state of the wheel system) and delivers control signals to actuators within each wheel robot. The availability of such a self-contained wheel robot can radically simplify car design, especially chassis design and engineering which become much easier, faster and cheaper because the chassis no longer houses components such as the motor, drive shaft and gear box.

Instead of a rigid chassis holding the wheels in place, the central wheel controller 801 (or a distributed computing system using separate controllers at each wheel which communicate with one another as needed) coordinates the action of the wheel robots to perform that function. Using position sensors at each wheel location, the computing system can control any number of wheel robots that work together to drive a vehicle or a set of connected vehicles so that each wheel is positioned relative to the others in a desired configuration, such as at the corners of a square where the wheels are typically positioned by a rigid automobile chassis. Using independently controlled and positioned wheel robots, the control system can be designed such that it directs those wheel robots to maintain that square, without the need for a rigid mechanical link to perform that function. The control signals from the central controller delivered to each wheel robot controls the amount of power applied to the drive motor 803, the amount of braking created regeneratively by the motor 803 and a disk brake mechanism 805 or the like, and the rotation of the wheel about its steering axis controlled by a steering actuator 807.

The dynamic forces to which each wheel is subjected during driving are attacked where they are generated, allowing for lighter components, more precise suspension control (ride, handling, steering axis, reducing tire wear). The suspension elements, generally indicated at 808 in FIG. 37, that have been described above can control different suspension aspects (camber, castor, toe in, ride height, steering angle, springing, damping) independently from each other. The suspension elements which support the wheel with respect to the chassis may consist of both conventional passive spring and shock absorbing systems, as well as active suspension elements which include powered actuators which apply forces between the chassis and each wheel, the magnitude of the forces being continuously computed by the controller 801 in accordance with optimization routines which may themselves be adaptively altered in response to changing driving conditions. For example, an active suspension control system of the type described in U.S. Pat. No. 5,519,612 issued on May 21, 1996 to Liubakka et al entitled "Active Suspension System with Adaptive Actuator Gain Adjustment" describes a system for adaptively controlling suspension forces and ride heights to improve passenger comfort and handling over a variety of road surfaces. By independently controlling wheel position variables including toe-in, toe-out, castor, and steering, the suspension elements can be adjusted to perform equally well in the "forward" and "reverse" direction at any speed. The steering axis may be positioned in the center of the tire contact patch or at the linkage point between the suspension and the chassis, or both, permitting the construction of a truly omni directional vehicle. As previously discussed, the position and orientation of each wheel may be adjusted using actively movable "legs" which attach each wheel assembly to the chassis, allowing the behavior of the system may be dynamically controlled to provide improved on-road speed and handling with excellent off-road capability.

CONCLUSION

It is to be understood that the methods and apparatus which have been described above are merely illustrative applications of the principles of the invention. Numerous modifications may be made by those skilled in the art without departing from the true spirit and scope of the invention.

What is claimed is:

1. A suspension system for connecting a wheel to a vehicle chassis comprising, in combination,
   a wheel rim for mounting a tire,
   a frame member secured to said vehicle chassis and extending into the region surrounded by said wheel rim,
   one or more suspension elements including springs or dampers or both positioned within said region surrounded by said wheel rim for supporting said frame member with respect to said wheel rim while permitting movement between said wheel rim and said frame member,
   an electric drive motor attached to said frame member so that said electric drive motor does not travel with said wheel rim but is instead supported by and travels with said frame member during said movement between said wheel rim and said frame member, said drive motor including a motor driven shaft, and
   a drive mechanism coupled to said motor driven shaft for applying a rotary drive force to said wheel rim.

2. A suspension system as set forth in claim 1 wherein said drive mechanism comprises, in combination,
   an annular rim gear rigidly attached to said wheel rim, and
   a drive gear mounted on a drive gear shaft positioned adjacent to and spaced from said wheel rim so that said gear drive engages with said annular rim gear, said drive gear shaft being mechanically coupled to said motor driven shaft to apply said rotary drive force between said motor and said wheel rim.

3. A suspension system as set forth in claim 2 wherein said drive mechanism further comprises one or more brackets positioned in load bearing engagement with said wheel rim, said one or more suspension elements being positioned to support said frame member with respect to said one or more brackets, and said drive gear shaft being attached to said bracket(s).

4. A suspension system as set forth in claim 2 wherein said drive mechanism further comprises a belt or chain for coupling said drive gear shaft to said motor driven shaft.

5. A suspension system as set forth in claim 4 wherein said drive mechanism further comprises one or more brackets positioned in load bearing engagement with said wheel rim, said one or more suspension elements being positioned to support said frame member with respect to said one or more brackets, and said drive gear shaft being attached to one of said brackets.

6. A suspension system as set forth in claim 5 further comprising bearings in rolling engagement with both said one or more brackets and said wheel rim for supporting said wheel rim for rotational movement with respect to said one or more brackets.

7. A suspension system as set forth in claim 2 wherein said drive mechanism further comprises one or more additional gears for coupling said drive gear shaft to said motor driven shaft.

8. A suspension system as set forth in claim 7 wherein said drive mechanism further comprises one or more brackets positioned in load bearing engagement with said wheel rim, said one or more suspension elements being positioned to support said frame member on said one or more brackets and said drive gear shaft being attached to one of said brackets.

9. A suspension system as set forth in claim 8 further comprising bearings in rolling engagement between said one or more brackets and said wheel rim for supporting said wheel rim for rotational movement with respect to said one or more brackets.

10. A suspension system as set forth in claim 7 wherein said additional gears include a first gear coupled to said motor driven shaft and a second gear that engages with said first gear and with said drive gear.

11. A suspension system as set forth in claim 10 wherein said first and second gears are mounted at the respective ends of a first link member and wherein said second gear and said drive gear are mounted as the respective ends of a second link member, said first and second link members forming an articulated support that maintains the engagement of said first gear with said second gear and the engagement of said second gear with said drive gear while permitting said first gear and said drive gear to move with respect to one another as said wheel rim moves relative to said frame member.

12. A suspension system as set forth in claim 2 wherein the longitudinal axis of said drive gear shaft is oriented vertically and is rotationally coupled to and moves vertically with respect to a drive assembly coupled to and rotated by said motor driven shaft.

13. A suspension system as set forth in claim 12 wherein said drive assembly is attached to said frame member.

14. A suspension system as set forth in claim 1 wherein said drive mechanism further comprises a wheel hub for mounting said wheel rim for rotation about an axle, said one or more suspension elements being positioned to support said frame member on said axle, and said drive mechanism being coupled between said motor driven shaft and said axle to apply rotary drive force to said wheel rim.

15. A suspension system as set forth in claim 14 wherein said drive mechanism further comprises a belt or chain for coupling said axle to said motor driven shaft.

16. A suspension system as set forth in claim 14 wherein said drive mechanism further comprises one or more gears for coupling said axel to said motor driven shaft.

17. A suspension system as set forth in claim 14 wherein said axle is supported for motion along a straight line vertical path by a Peaucellier linkage connected to said frame member at two pivot points.

18. A suspension system as set forth in claim 1 including a support arm, means for attaching one end of said support arm for pivoting motion about a pivot point on said frame member that is spaced from the rotational axis of said wheel rim, said one or more suspension elements being positioned between said support arm and said frame member, and said wheel rim being supported by said support arm whereby said support arm pivots about said pivot point when said wheel rim moves relative to said frame member.

19. A suspension system as set forth in claim 18 wherein said drive mechanism comprises, in combination,
an annular rim gear rigidly attached to said wheel rim, and
a drive gear mounted on a drive gear shaft positioned adjacent to and spaced from said wheel rim so that said gear drive engages with said annular rim gear, said drive gear shaft being mechanically coupled to said motor driven shaft to apply said rotary drive force from said motor to said wheel rim.

20. A suspension system as set forth in claim 19 wherein said drive mechanism further comprises a bracket positioned in load bearing engagement with said wheel rim, said one or more suspension springs being positioned to support said frame member with respect said bracket while permitting said wheel rim and said drive gear shaft being attached to said bracket.

21. A suspension system as set forth in claim 18 wherein said drive mechanism further comprises a wheel hub for mounting said wheel rim for rotation about an axle attached to said support arm.

22. A suspension system as set forth in claim 1 including means for varying the position or orientation of said frame member relative to said chassis.

23. A suspension system as set forth in claim 22 wherein said means for varying the position or orientation of said frame member defines a steering axis for rotating said wheel rim with respect to said vehicle chassis.

24. A suspension system as set forth in claim 23 wherein said steering axis passes through the region where said tire contacts a road surface.

25. A suspension system as set forth in claim 1 wherein said suspension system further includes a brake connected between said frame member and said wheel rim for retarding the rotational motion of said wheel rim.

26. A suspension system as set forth in claim 1 further including a signal processor for delivering motor control signals to said control the amount of power applied to or generated by said electric drive motor.

27. A suspension system as set forth in claim 26 further including a brake for retarding the rotational motion of said wheel rim wherein said signal processor delivers braking control signals to control the operation of said brake.

28. A suspension system as set forth in claim 26 wherein said suspension elements include active actuators that create suspension forces between frame member and said wheel rim.

29. A suspension system as set forth in claim 27 wherein said suspension elements include further active actuators that position said wheel rim with respect to said vehicle chassis.

30. A suspension system as set forth in claim 28 further including one or more sensors for determining the position of said wheel and wherein said signal processor includes means for generating position control signals to vary the position of said wheel rim relative to the position of one or more other wheels supporting said vehicle chassis.

* * * * *